Sept. 11, 1923. 1,467,503
H. W. ROTTEL
COOLING MECHANISM FOR COMPRESSORS
Filed Dec. 29, 1919
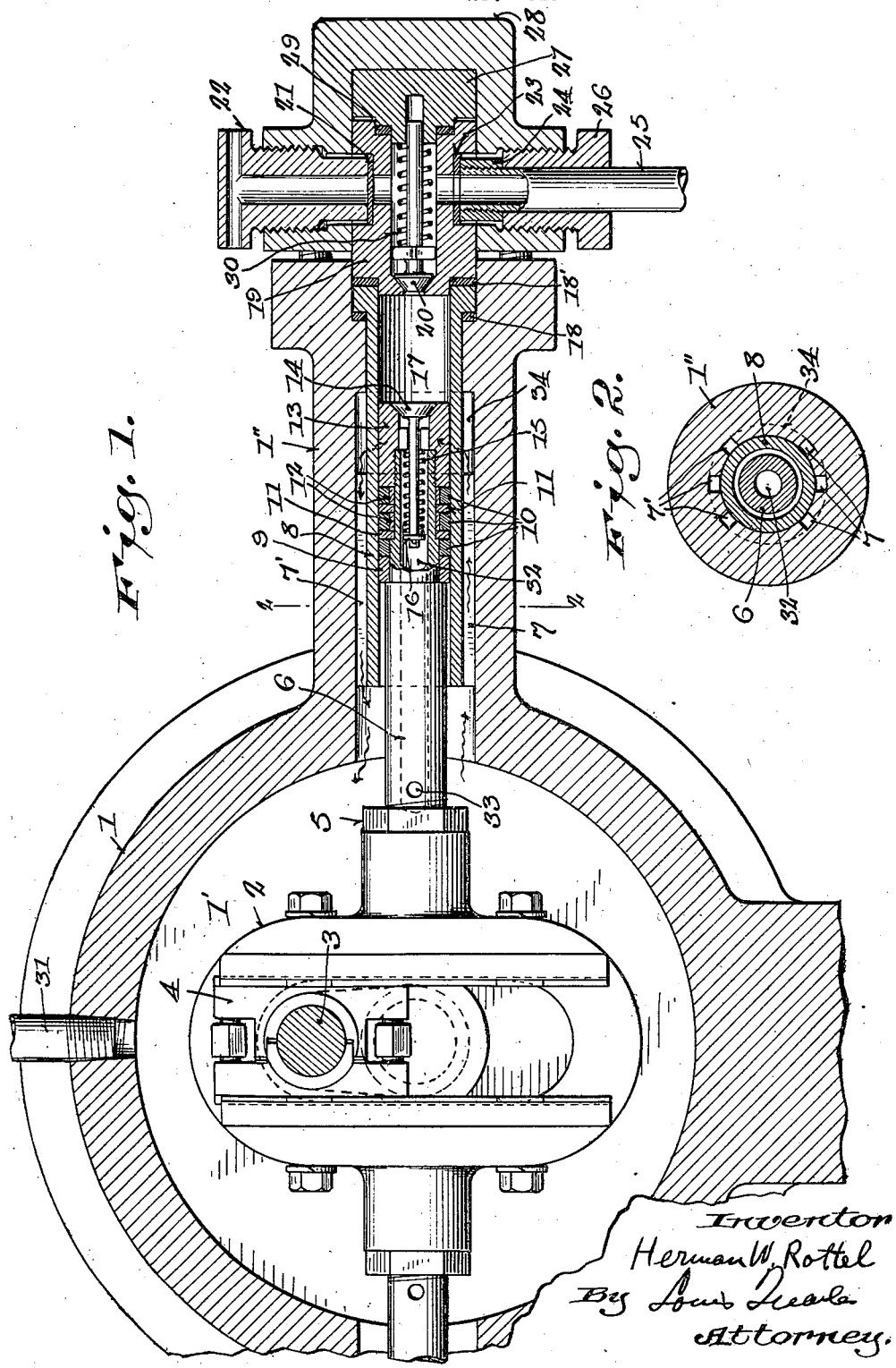

Patented Sept. 11, 1923.

1,467,503

UNITED STATES PATENT OFFICE.

HERMAN W. ROTTEL, OF MILWAUKEE, WISCONSIN.

COOLING MECHANISM FOR COMPRESSORS.

Application filed December 29, 1919. Serial No. 348,163.

*To all whom it may concern:*

Be it known that I, HERMAN W. ROTTEL, a citizen of the United States, residing at Milwaukee, county of Milwaukee, and State of Wisconsin, have invented certain new and useful Improvements in Cooling Mechanism for Compressors, of which the following is a specification.

My invention relates to new and useful improvements in compressors for ice machines and is particularly adapted for cooling the cylinder containing the piston and the compression chamber by means of the gas that is used in compressors for the machine.

Ice machines of the compression type now in use provide for cooling the compression chamber by means of a motor circulation system or other forms of external cooling devices. Such devices require a separate circulating pump or other power externally applied to circulate the cooling fluid all of which are more complex and require more attention and power to operate the same.

The object of my invention is to provide a simple and compact means of cooling the cylinder containing the piston and the compression chamber by means of cool gas returned from the cooling coils, which circulation is maintained without the application of external power, viz: by convection currents caused by the difference in temperature of the gas and by the reciprocation of the piston cross-head and other moving parts.

Another advantage of my machine is that the returned gas from the cooling coils, as it enters the suction chamber of the ice machine is so cold that it tends to gum up the oil but with my device the gas in cooling the cylinder containing the piston and the compression chamber is heated to a certain extent so as to raise the temperature of the gas in the suction chamber thereby aiding the lubrication.

With the above and other objects in view, my invention has particular relation to certain novel features of construction, operation and arrangement of parts an example of which is given in this specification and illustrated in the accompanying drawings wherein:

Fig. 1 is a vertical section through the crank case and cylinder of a compressor, parts being broken away.

Fig. 2 is a vertical section on the line 2—2 of Fig. 1.

Having particular reference to Fig. 1, 1 is a crank case; 1' is a crank chamber; 1" is an extension of crank case 1; 3 is a crank which transmits motion to a slide 4 in cross-head 2, so as to reciprocate piston 6 which is threaded in cross-head 2 and held in place by a lock nut 5; 8 is a compression cylinder; 7 and 7' are ventilating ducts respectively below and above the compression cylinder 8; 9 is a ring of soft metal to prevent the piston rod 6 from injuring the cylinder 8; 10 are piston rings; 11 are collars to separate piston rings 10; 12 are sleeves to space collars 11; 13 is a piston head connected with the piston rod 6, which also forms the valve seat for the suction valve 14; 16 is a collar which forms a shoulder for spring 15 to keep the valve 14 normally seated; 17 is the compression chamber; 18 and 18' are gaskets to prevent leakage; 19 is a block of metal forming the seat of the discharge valve 20; 21 is a safety valve disc; 22 is a safety valve; 23 is a gasket; 24 is a collar threaded on to the discharge pipe 25; 26 is a collar threaded into the cylinder head 28 against the collar 24 and the gasket 23 to make a tight joint; 27 is a block of metal to retain the stem of the discharge valve 20 forming a stop for the discharge valve spring 30; 29 is a packing between the block of metal 19 and the block of metal 27; 31 is the suction inlet for the crank chamber 1'; 32 is a passage in the interior of the piston rod 6 opening into the crank chamber 1' by means of opening 33 in piston rod 6; 34 is an annular passage formed between cylinder 8 and the extension of the crank case 1" and connecting ducts 7 with the ducts 7' at the ends of the said ducts 7 and 7', which are adjacent to the compression chamber 17.

In operation my device works as follows:

Power is applied to crank 3, which reciprocates piston rod 6 into the cylinder 8, compressing the gas in the compression chamber 17, which gas is discharged through discharge valve 20 and discharge pipe 25. On the return stroke piston rod 6 will open suction valve 14, admit gas into the compression chamber 17 from crank chamber 1' through the opening 33 and the passage 32 in the piston rod 6. The gas in the crank chamber 1' returning from the cooling coils at a low temperature will enter the lower ducts 7 around the cylinder 8 and the ends of the ducts 7 and 7' being connected together by the annular passage 34, the heat of compression created in chamber 17 and transmitted to cylinder 8, cylinder head 13 and piston rod 6 will raise the temperature of the gas in the uppermost ducts and cause it to return to the crank chamber 1' by means of the convection currents created by the difference in temperature. These currents are aided by the reciprocating motion of the cross-head 2 and the piston rod 6. However, the said convection currents automatically cease to cause the gas to circulate around the cylinder 8 before the temperature of cylinder 8 is lowered to that of the gas in crank chamber 1'. This results in keeping cylinder 8 at an approximately even temperature, thus eliminating unnecessary friction and wear of the piston rings 10 on the inner walls of the cylinder 8, that would otherwise be caused by variations in temperature with the resultant contraction and expansion of cylinder 8.

It is obvious that an eccentric might be substituted for a crank and that various other modifications in the details of construction and arrangement of parts may be made within the spirit and intended scope of my invention.

Having particularly described my invention, I claim:

1. In a device of the class described the combination of a crank case, a crank case extension, a non-vertical cylinder therein for compressing gas for refrigeration purposes, a space between the crank case extension and the cylinder forming a gas jacket for the cylinder, a plurality of openings placed one above the other and connecting the crank case and jacket, whereby the returned gas is caused to circulate in the crank case and jacket until the cylinder is cooled to a temperature slightly greater than the gas in the crank case, thereby maintaining said cylinder at an even temperature and one which is slightly greater than that of the gas in the crank case.

2. In a device of the class described the combination of a non-vertical cylinder, a piston and piston rod, a gas retaining means external thereto and concentric therewith, the piston mounted in said cylinder and reciprocated by means of the piston rod, means for introducing the gas to be compressed into the cylinder through an opening in the piston and through or along the piston rod, spacing means for holding the cylinder and the external gas retaining means in place, and a series of upper and lower perforations in the spacing means to permit the passage of gas therethrough to cool the cylinder.

3. In a device of the class described the combination of a non-vertical cylinder, a piston and piston rod, a gas retaining means external thereto and concentric therewith, the piston mounted in said cylinder and reciprocated by means of the piston rod, a crank case, a crank mounted in the crank case, means for introducing the gas to be compressed into the cylinder through an opening in the piston and through or along the piston rod, spacing means for holding the cylinder and the external gas retaining means in place, a series of upper and lower perforations in the spacing means to permit the passage of gas therethrough to cool the cylinder, whereby the cold gas is caused to circulate from the crank case through the lower perforations in the spacing means and between the cylinder and gas containing means and back through the upper of said perforations into the crank case.

HERMAN W. ROTTEL.

Witnesses:
VALENTINE RAYMOND,
HOWARD A. HARTMAN.